United States Patent [19]
Kishi et al.
[11] Patent Number: 4,615,469
[45] Date of Patent: Oct. 7, 1986

[54] ELECTRICALLY POWERED SQUEEZER FOR DISPENSING A VISCOUS SUBSTANCE

[75] Inventors: Ichiro Kishi; Makoto Miyata; Shunichi Hata, all of Hikone, Japan

[73] Assignee: Matsushita Electric Works, Ltd., Japan

[21] Appl. No.: 615,597

[22] Filed: May 31, 1984

[30] Foreign Application Priority Data

May 31, 1983 [JP] Japan .................................. 58-95995

[51] Int. Cl.[4] .......................... B05B 11/02; F16H 3/44

[52] U.S. Cl. .................................... 222/327; 222/333; 222/390; 74/785

[58] Field of Search ................................ 222/325-327, 222/333, 390; 74/785, 788

[56] References Cited

U.S. PATENT DOCUMENTS

| | | | |
|---|---|---|---|
| Re. 26,180 | 4/1967 | Frenzel et al. | 222/327 X |
| 3,415,419 | 12/1968 | Jewett et al. | 222/333 |
| 3,550,815 | 12/1970 | Salonen | 222/333 X |
| 3,566,471 | 3/1971 | Bull | 74/785 X |
| 3,799,407 | 3/1974 | Loethen et al. | 222/333 |
| 3,854,629 | 12/1974 | Blieberger | 222/333 X |

*Primary Examiner*—Joseph J. Rolla
*Assistant Examiner*—Kevin P. Shaver
*Attorney, Agent, or Firm*—Stevens, Davis, Miller & Mosher

[57] ABSTRACT

An electrically powered squeezer such as a caulking gun for dispensing a viscous substance such as a caulking or sealing compound. The gun comprises a housing carried by an operator and incorporating an electric motor and a switch for energizing and deenergizing the motor. The housing is formed with a holder for receiving therein a cartridge filled with the above viscous substance and having a discharge nozzle. Incorporated within the housing is a pressing element driven by the motor to compress the cartridge wall so as to force the viscous substance out of the cartridge through the nozzle. A release mechanism is included to disengage the driving connection between the motor and the pressing element when the switch deenergizes the motor, in such a way as to allow the pressing element to retract to a position where the pressing element no longer exerts pressure upon the viscous substance. Accordingly, when the squeezing of the viscous substance is interrupted, the consequential retraction of the pressing element releases the residual pressure in the viscous substance remaining within the cartridge which developed in the previous squeezing by the pressing element, thus preventing the viscous substance from drooping or oozing from the nozzle.

6 Claims, 7 Drawing Figures

ELECTRICALLY POWERED SQUEEZER FOR DISPENSING A VISCOUS SUBSTANCE

BACKGROUND OF THE DISCLOSURE

1. Fields of the Invention

This invention is directed to an electrically powered squeezer such as a caulking gun for loading or dispensing a viscous substance adapted in use to drive in a viscous substance such as a caulking or sealing compound for pointing or watertight sealing.

2. Description of the Prior Art

Conventionally, there have been provided caulking guns in combination with a viscous substance filled-in cartridge which has a discharge nozzle at one end and has an axially movable piston or plunger at its other end. A major problem associated with prior guns of this kind, however, has been such that the viscous substance will be still forced out due to its residual pressure for a short time after the squeezing operation is stopped.

SUMMARY OF THE INVENTION

The above disadvantage has been obviated by the present invention which comprises a housing accommodating an electric motor and switch means therefor in combination with a cartridge filled with a viscous substance such as a caulking or sealing compound. The cartridge is received or inserted within a holder provided in the housing at a fixed position. A pressing element is held within the housing so as to be movable between a compressing position where it compresses the viscous substance via a moveable end wall of the cartridge to discharge the substance through the nozzle thereof and a free position where it no longer exerts pressure upon the substance. Said motor is drivingly connected to the pressing element to force it into the above compressing position when the switch means is actuated.

When the switch means deenergizes the motor which release means which disengage the driving connection from the motor to the pressing element and allows the pressing element to retract from the compressing position to the free position, whereby when the squeezing operation is stopped, residual pressure in the remaining substance within the cartridge can be released as it forces the pressing element back to the free position, effectuating immediate cessation of squeezing of the viscous substance through the nozzle and preventing the substance in the cartridge from dropping out or oozing from the nozzle.

Accordingly, it is a primary object of the present invention to provide an electrically powered caulking gun for loading a viscous substance which is capable of preventing ooze or droop of viscous substance after the interruption of the squeezing operation.

Said release means in a preferred embodiment of the present invention comprises a clutch mechanism interposed in the driving connection between the electric motor and the pressing element, such driving connection comprising a plurality of planetary gears connected in a multistage speed reduction arrangement. One of the planetary gears has an internal gear capable of being selectively fixed and unfixed by a latch, while the other planetary gears have their respective internal gears fixed. The above latch is normally set in a fixed position to engage the internal gear of the particular planetary gear to arrest the rotary motion thereof for establishing a driving connection from the motor to the pressing means, and it is actuated in synchronism with the deenergization of the motor by the switch means to disengage that internal gear to render the same freely rotatable for interrupting the driving connection. It is this planetary gear selectively fixed and unfixed by the complementary latch that defines said clutch mechanism for selectively connecting and disconnecting the pressing element with and from the motor. With this arrangement, a high reduction ratio is attained for the gradual squeezing of the substance out of the cartridge by the motor at the same time a simple structure is obtained for the releasing means or clutch mechanism, which makes the best of the speed reduction means to be readily incorporated in the driving connection without undue increase in the number of the components.

It is therefore another object of the present invention to provide an electrically powered squeezer which assures a gradual squeezing performance as well as a simple structure for the releasing means or clutch means essential to the present invention.

These and additional objects and advantages of the invention will be more apparent from the following detailed description when taken in conjunction with the attached drawings.

DETAILED DESCRIPTION OF THE PREFERRED EMBODIMENT

Figure 1:
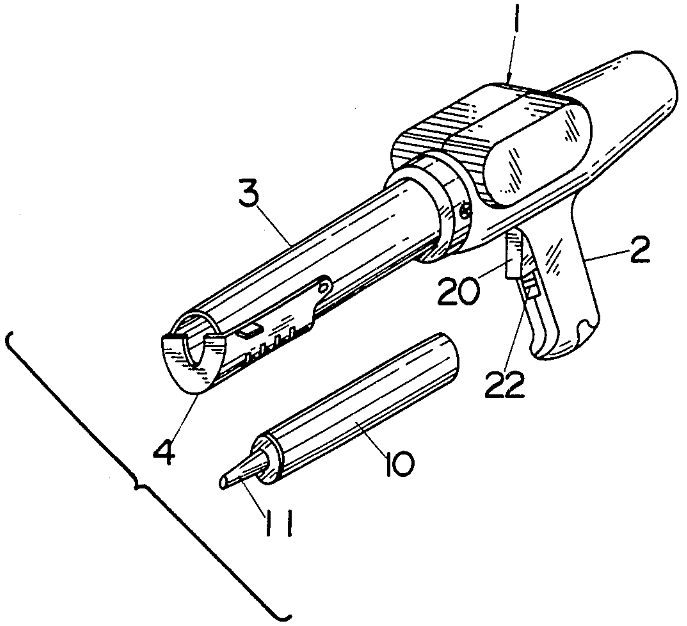
FIG. 1 is a perspective view of an electrically powered squeezer such as a caulking gun, with insertable cartridge shown in a removed position, in accordance with a preferred embodiment of the present invention.
Figure 2:
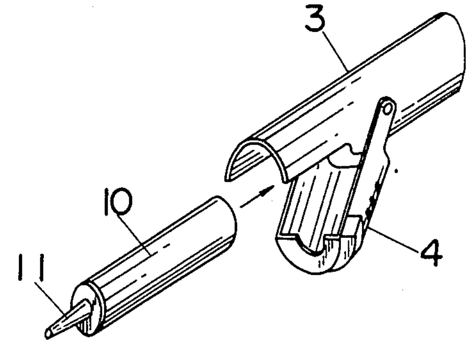
FIG. 2 is a fragmentary view of the above caulking gun in perspective illustrating schematically how the cartridge is inserted in the housing.
Figure 3:
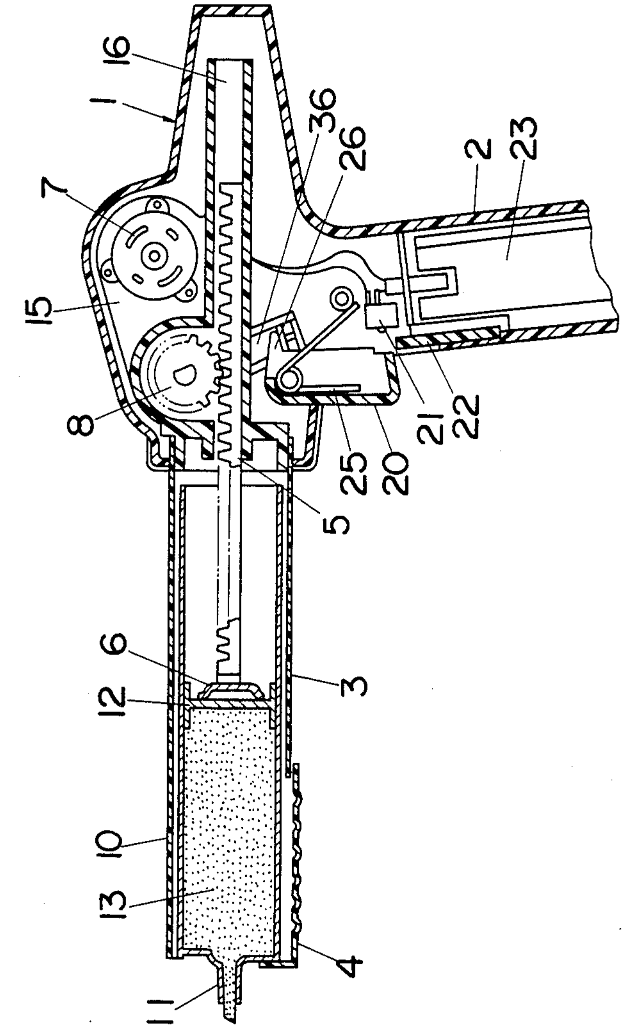
FIG. 3 is a partially cut away longitudinal sectional view of the above gun.

Referring now to FIGS. 1 to 3, an electrically powered caulking gun for loading or dispensing a viscous substance embodying the present invention comprises a hollow body or housing 1 with an integral grip 2 to be grasped by the hand of an operator and a hollow cylindrical holder 3 attached to the front of the housing 1 for receiving therein an insertable cartridge 10 filled with a viscous substance 13 such as a caulking or sealing compound. The holder 3 is provided with a hinged cover 4 at its front for insertion of the cartridge 10, which is retained at a fixed position by the closure of the cover 4 within the holder 3 with its nozzle 11 extending forwardly through a front opening defined between the holder 3 and the cover 4. Said cartridge 10 is in the form of a tube having as its bottom a moveable bottom wall forming a plunger 12 which is designed to be movable inside the tube in the axial direction thereof.

Accommodated within the housing 1 are an electric motor 7 and a driving mechanism driven by the motor 7 to squeeze the viscous substance 13 out of the cartridge 10 through its nozzle 11. A trigger switch 20 for the motor 7 is mounted to extend through the housing 1 for actuating an electrical switch 21, which is closed by pulling the trigger switch 20 to energize the motor 7. The trigger switch 20 is biased by a torsion spring 25 in the direction of opening the electric switch 21. A lock lever 22 slidably mounted on the grip 2 engages the trigger switch 20 upon being moved upwardly to lock it in a disable position. Received within the grip 2 is a removable battery pack 23 composed of a group of rechargeable cells for energizing the motor 7.

Figure 4:
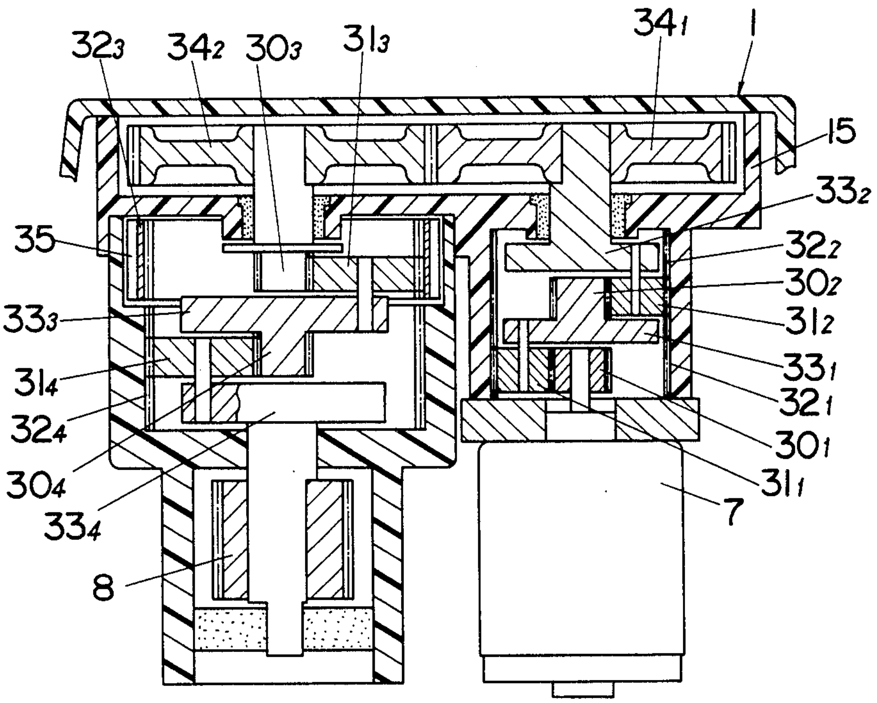
FIG. 4 is a sectional view of speed reduction means employed in the above gun.

Said driving mechanism includes speed reduction means composed of a multistage planetary gear train, the input end of which is connected to the motor 7 and the output end of which is connected to a pinion 8. Meshed with the pinion 8 is a rack formed on a press rod 5 which extends axially of the holder 3 with its front portion projecting into the holder 3. The press rod 5 carries at its front end a pressing element 6 engageable with said plunger 12 forming the bottom wall of the cartridge 10 and is mounted to be capable of reciprocating in the axial direction of the holder 3 such that the pressing element 6 is movable between a compressing position where it forces the plunger 12 forwardly to squeeze the viscous substance 13 through the nozzle 11 and a free position where it no longer exerts pressure upon the plunger 12 or the viscous substance 13 within the cartridge 10. An elongated hollow guide 16 for reciprocatory movement of the press rod 5 is integrally formed with a gear casing 15 which encloses four sets of planetary gears and the pinion 8, as best shown in FIG. 4. These four sets of intermeshing planetary gears are employed to attain a high speed reduction ratio of 1/1000 to 1/1500 in such a way as to apply a pressure of 100 $Kg/cm^2$ or more to the plunger 12 of the cartridge 10. Cooperating with said speed reduction means is release means which upon the motor 7 being deenergized by the operation of said trigger switch 20 disengages the driving connection between said pressing element 6 and the motor 7 so as to allow the pressing element 6 to move backwardly away from the plunger 12. This prevents the viscous substance 13 in the cartridge 10 from oozing out of the nozzle 11 when the squeezing operation is interrupted, since residual pressure developed in the previous squeezing and still remaining in the substance after the interruption of squeezing can be released immediately by pushing back the pressing element 6. Such a droop would be inevitable if the plunger 12 were kept at a fixed position by the pressing element 6. The discharge of the viscous substance through the nozzle 11 can be stopped immediately after the interruption of the squeezing operation. Said release means comprises a clutch mechanism which is incorporated in said speed reduction means or in four sets of planetary gears and is actuated by said trigger switch 20, the details of which will be discussed in the following paragraph.

Figure 5A:
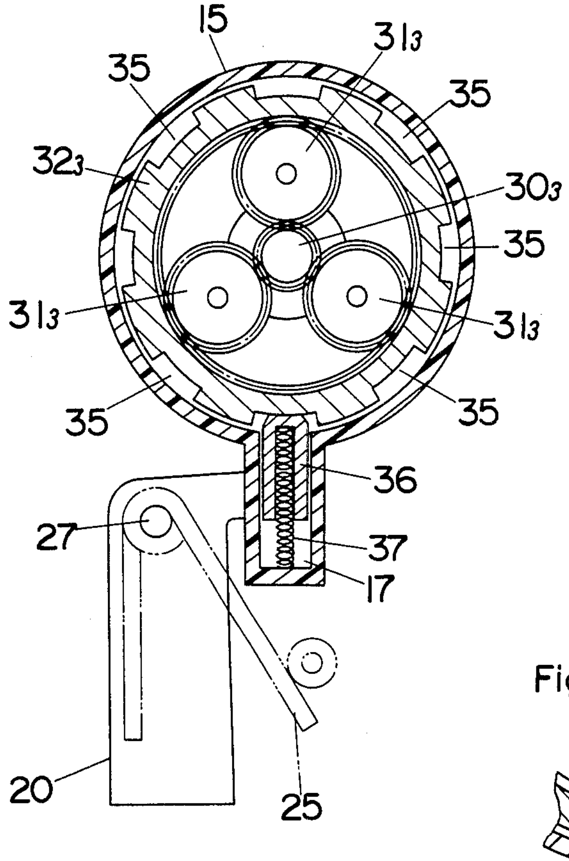
FIG. 5A is an explanatory view illustrating a clutch mechanism in its engaged position as employed in the above gun.
Figure 5B:
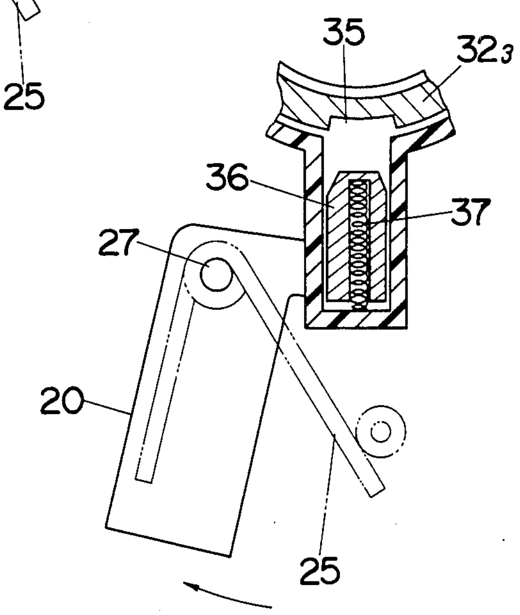
FIG. 5B is an explanatory view illustrating the above clutch mechanism in its released position.
Figure 6:
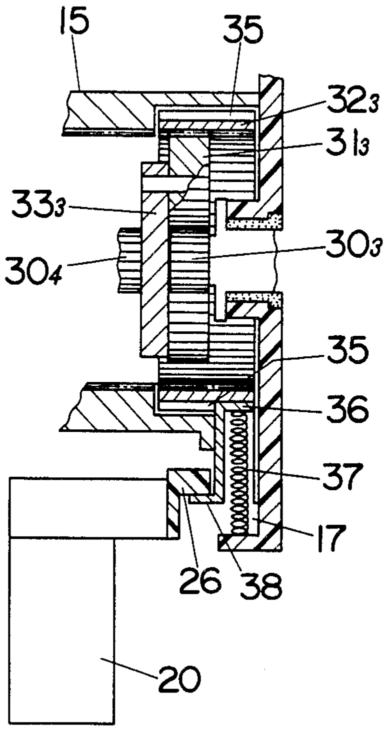
FIG. 6 is an explanatory view illustrating the above clutch mechanism viewed from the right in FIGS. 5A and 5B.

Referring to FIG. 4, the intermeshing relationship of said four sets of planetary gears is illustrated. Each of the planetary gears is composed of a sun gear $\mathbf{30_1}$ ($\mathbf{30_2}$, $\mathbf{30_3}$, $\mathbf{30_4}$), planet gears (only one of which is shown for each set planetary gears) $\mathbf{31_1}$ ($\mathbf{31_2}$, $\mathbf{31_3}$, $\mathbf{31_4}$), an internal gear $\mathbf{32_1}$ ($\mathbf{32_2}$, $\mathbf{32_3}$, $\mathbf{32_4}$), and a planet carrier $\mathbf{33_1}$ ($\mathbf{33_2}$, $\mathbf{33_3}$, $\mathbf{33_4}$). The sun gear $\mathbf{30_1}$ of the first stage planetary gear is connected with an output rotor shaft of the motor 7 to be rotated thereby, while the sun gears of 2nd, 3rd and 4th stages are respectively formed integrally with the planet carriers of the previous stage to be coaxial therewith. The planet carrier $\mathbf{33_4}$ of the final stage is coupled to said pinion 8 to rotate it. Said four planetary gears are arranged in pairs, one pair including 1st and 2nd planetary gears of which gears are disposed on a first common axis and the other pair including 3rd and 4th planetary gears of which gears are disposed on a second common axis parallel to the first common axis. A pair of spur gears $\mathbf{34_1}$ and $\mathbf{34_2}$ meshing with one another are interposed intermediate the pairs of planetary gears for connection thereof. The above parallel disposition of the planetary gears on the above first and second common axes is responsible for proper balancing of the motor 7 of rather heavy construction and the planetary gears when disposed above the press rod 5 within the housing 1, as shown in FIG. 3, so that the gun may be easily manipulated with one hand. The above planetary gear train is designed to attain a speed reduction ratio of about 1/6 at each stage by rotatively fixing the corresponding internal gears. The internal gears of the planetary gears except for the 3rd stage planetary gear are integrally formed on the inner surface of the gear casing 15 to be rotatively fixed, while the internal gear $\mathbf{32_3}$ of the 3rd stage planetary gear is designed to be selectively fixed and unfixed or freely rotatable. It is this 3rd stage planetary gear that constitutes said clutch mechanism which operates with a complementary latch 36 to connect and disconnect the driving connection from the motor 7 to the pressing element 6. This internal gear $\mathbf{32_3}$, as shown in FIG. 5A, is provided along its periphery with a plurality of spaced recesses 35 into which said latch 36 can be projected. The latch 36 is slidably received in a radially extending groove 17 formed in said gear casing 15 and is biased by a spring 37 to project into one of the recesses 35 so as to arrest the internal gear $\mathbf{32_3}$, through which the output of the motor 7 is transmitted through the planetary gear train and the pinion 8 for the forward movement of the pressing element 6. Said trigger switch 20 pivotally connected to the housing 1 by a pivot pin 27 is formed at its one end with a prong 26 which is engageable with a protrusion 38 on the latch 36, as best shown in FIG. 6. When the trigger switch 20 is released in the direction indicated by an arrow in FIG. 5B about the pivot axis 27 to deenergize the motor 7, the prong 26 comes into engagement with the protrusion 38 of the latch 36 to force it downwardly against the biasing force of the spring 37 so as to disengage it from the recess 35 of the internal gear $\mathbf{32_3}$, whereby the internal gear $\mathbf{32_3}$ is rendered to be freely rotatable to disengage the driving connection from the motor 7 to the pinion 8. In this condition, no substantial restriction is applied to the pinion 8 so that the press rod 5 meshed with the pinion 8 is allowed to be freely movable in the axial direction of the holder 3. Consequently, when the squeezing operation is interrupted by releasing the trigger switch 20 to deenergize the motor 7 at the same time to disengage the clutch mechanism, the pressing element 6 together with the plunger 12 of the cartridge 10 can be readily and immediately forced back by residual pressure in the viscous substance 13 to release this residual pressure, such that no drooping or oozing of the viscous substance 13 can occur at this interruption of squeezing operation, enabling good finish of caulking or sealing without relying on a particularly skilled technique.

The above description and particularly the drawings are set forth for purposes of illustration only. It will be understood that many variations and modifications of the embodiments herein described will be obvious to those skilled in the art, and may be carried out without departing from the spirit and scope of the invention.

What is claimed is:

1. An electrically powered caulking gun for dispensing a viscous substance comprising:
   an elongated housing with a holder for receiving therein an elongated cartridge having a discharge nozzle at one end and for carrying a supply of a viscous substance;
   a pressing element mounted for movement within the housing to exert a compressing action on a viscous substance to discharge it from the nozzle means of a cartridge received in said housing;
   an electric motor carried by the housing and operatively connected to a multistage geared speed reduction means which is in turn connected to the pressing element for driving it into a compressing position;
   switching means on the housing for energizing and deenergizing said electric motor;
   a driving connection between the motor and the pressing element comprising clutch release means connected to said switching means to release the driving connection between the motor means and the pressing element immediately when the motor is deenergized, thus permitting the pressing element to be freely retracted from a compressing position by the residual back pressure in the viscous substance, said clutch release means being a radially moveable latch mounted for movement toward and away from one gear of said multistage geared speed reduction means.

2. The caulking gun of claim 1 in which the connection between the switching means and said clutch release means is a mechanical linkage comprising a trigger mechanism having a finger engaging a protrusion on said latch.

3. An electrically powered caulking gun for dispensing a viscous substance comprising:
   an elongated housing with a holder for receiving therein an elongated cartridge carrying a supply of a viscous substance and having a nozzle at one end;
   a pressing element mounted for movement within the housing to exert a compressing action on a viscous substance to discharge it from the nozzle of a cartridge received in said housing;
   an electric motor carried by the housing and operatively connected to a multistage geared speed reduction means having at least one planetary transmission therein;
   a driving connection between the motor and the pressing element comprising
   (a) a rack connected to said pressing element with a pinion of said at least one planetary transmission drivingly connected thereto;
   (b) means for deenergizing the motor and releasing the driving connection between said at least one planetary transmission and said rack so that the pressing element is freely retracted from a compression position by the residual back pressure in the viscous substance, the means for deenergizing the motor and releasing the driving connection comprising an electric switch in a feed line to said electric motor, a latch mounted for movement toward and away from an internal gear of said at least one planetary transmission driving said pinion, and a mechanical linkage between said switch and said latch.

4. The caulking gun of claim 3 in which said pinion is driven through said internal gear of said at least one planetary transmission and a gear thereof has a plurality of circumferentially spaced recesses positioned for selective engagement by said latch.

5. A power operated caulking gun for dispensing a viscous substance comprising:
   a housing with a holder for receiving therein a cartridge having a discharge means and for carrying a supply of a viscous substance;
   a pressing element mounted for movement within the housing to exert a compressing action on a viscous substance to discharge it from a cartridge received in said housing;
   motor means carried by the housing and operatively connected to the pressing element for driving it into a compressing position;
   switching means on the housing for actuating and deactivating the motor; and
   a driving connection between the motor and the pressing element comprising clutch means connected to said switching means to connect and disconnect the driving connection immediately when the motor is activated and deactivated respectively, said clutch means when deactivated allowing the pressing element to be retracted from a compressing position by the residual back pressure in the viscous substance and a multistage speed reduction means having a plurality of interconnected planetary gears, one of which has a controllable gear capable of being selectively fixed and unfixed rotatively, said clutch means being positioned to fix and unfix said controllable gear, the planetary gears other than said controllable gear having corresponding gears constantly fixed such that the controllable gear of said one planetary gear will establish the driving connection from the motor to the pressing element when it is fixed by said clutch means and disengage said driving connection when it is unfixed by said clutch means.

6. The caulking gun of claim 5 in which the motor is an electric motor and the switch means includes an electric switch connected to energize and deenergize said motor.

* * * * *